(12) United States Patent
Choi et al.

(10) Patent No.: US 10,005,354 B2
(45) Date of Patent: Jun. 26, 2018

(54) COOLING MODULE AND COOLING SYSTEM FOR VEHICLE

(71) Applicant: Hanon Systems, Daejeon (KR)

(72) Inventors: Jun-Young Choi, Daejeon (KR); Hyun-Kun Shin, Daejeon (KR); Yong-Nam Ahn, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 49 days.

(21) Appl. No.: 14/904,958

(22) PCT Filed: Dec. 30, 2014

(86) PCT No.: PCT/KR2014/013027
§ 371 (c)(1),
(2) Date: Jan. 14, 2016

(87) PCT Pub. No.: WO2015/102362
PCT Pub. Date: Jul. 9, 2015

(65) Prior Publication Data
US 2016/0311311 A1    Oct. 27, 2016

(30) Foreign Application Priority Data

Dec. 31, 2013 (KR) .......................... 10-2013-0168405
Dec. 29, 2014 (KR) .......................... 10-2014-0191975

(51) Int. Cl.
*B60H 1/32* (2006.01)
*B60K 11/04* (2006.01)
(Continued)

(52) U.S. Cl.
CPC ............. *B60K 11/04* (2013.01); *B60H 1/3227* (2013.01); *F25B 6/04* (2013.01); *F25B 39/00* (2013.01);
(Continued)

(58) Field of Classification Search
CPC ............. B60K 11/04; B60K 2001/005; B60K 2001/003; B60K 2001/006; F28F 1/10;
(Continued)

(56) References Cited

U.S. PATENT DOCUMENTS 5,476,138 A * 12/1995 Iwasaki .............. B60H 1/00321
165/41
2015/0052928 A1* 2/2015 Uchida .............. B60H 1/00278
62/239

FOREIGN PATENT DOCUMENTS

CN          103121393 A      5/2013
JP          2002187435 A     7/2002
(Continued)

*Primary Examiner* — Ana Vazquez
(74) *Attorney, Agent, or Firm* — Shumaker, Loop & Kendrick, LLP; James D. Miller

(57) ABSTRACT

The present invention relates to a cooling module including: a first radiator for cooling an engine; a second radiator located in front of the first radiator in an air flow direction to cool electric parts; a first condenser located in front of the second radiator in the air flow direction to condense a refrigerant through heat exchange with external air; and a second condenser located inside the second radiator to condense the refrigerant through heat exchange with electric part cooling water, whereby the high temperature and high pressure refrigerant passes through the water-cooled second condenser and then passes through the air-cooled first condenser, thus enhancing the cooling efficiency of the refrigerant to improve the entire efficiency of the cooling system for the vehicle.

15 Claims, 13 Drawing Sheets

(51) Int. Cl.
   *F25B 6/04*      (2006.01)
   *F28F 9/02*      (2006.01)
   *F28D 1/04*      (2006.01)
   *F25B 39/00*     (2006.01)
   *F28D 1/053*     (2006.01)
   *F28F 1/10*      (2006.01)
   *B60K 1/00*      (2006.01)
   *F25B 39/04*     (2006.01)

(52) U.S. Cl.
   CPC ....... *F28D 1/0435* (2013.01); *F28D 1/05325* (2013.01); *F28F 1/10* (2013.01); *F28F 9/0234* (2013.01); *B60K 2001/003* (2013.01); *B60K 2001/005* (2013.01); *B60K 2001/006* (2013.01); *F25B 39/04* (2013.01); *F25B 2339/047* (2013.01); *F28D 1/05391* (2013.01)

(58) Field of Classification Search
   CPC .. F28F 9/0234; F28D 1/05325; F28D 1/0435; F28D 1/05391; B60H 1/3227; F25B 6/04; F25B 2339/047; F25B 39/04; F25B 39/00
   See application file for complete search history.

(56)         References Cited

FOREIGN PATENT DOCUMENTS

| JP | 2406021749 A   |   | 1/2006 |
|----|----------------|---|--------|
| JP | 2006199206 A   |   | 8/2006 |
| JP | 2008056152 A   | * | 3/2008 |
| JP | 2010121604 A   |   | 6/2010 |
| JP | 2013126858 A   |   | 6/2013 |
| KR | 20110056598 A  |   | 5/2011 |
| KR | 20120074052 A  |   | 7/2012 |

\* cited by examiner

COOLING MODULE AND COOLING SYSTEM FOR VEHICLE

CROSS-REFERENCE TO RELATED APPLICATIONS

This patent application is a United States national phase patent application based on PCT/KR2014/013027 filed Dec. 30, 2014, which claims the benefit of Korean Patent Application Nos. 10-2014-0191975 dated Dec. 29, 2014 and 10-2013-0168405 dated Dec. 31, 2013. The disclosure of each of the above patent applications is hereby incorporated herein by reference in its entirety.

FIELD OF THE INVENTION

The present invention relates to a cooling module and a cooling system for a vehicle, and more particularly, to a cooling module and a cooling system for a vehicle that includes a first radiator, a second radiator, a first condenser, and a second condenser located inside the second radiator, thus enhancing refrigerant-condensing performance to provide the improvement in cooling efficiency and the reduction in the load of a compressor.

BACKGROUND OF THE INVENTION

In a vehicle at which an internal combustion engine is mounted, generally, the heat generated during the operation of the engine is transmitted to cylinder heads, pistons and valves, and accordingly, if the temperatures of the components are excessively raised, thermal expansion or degradation occurs to decrease the strength of the components, reduce the life span of the engine, make a bad combustion state to cause knocking or pre-ignition, and decrease the output of the engine.

In case where the engine is incompletely cooled, further, an oil film on the inner peripheral surface of a cylinder is cut to cause a bad lubricating function, and in addition, engine oil is deformed in quality to cause irregular abrasion of the cylinder. Furthermore, the piston may be fused to the inner peripheral surface of the cylinder.

In addition to the engine of the vehicle, on the other hand, the electric parts of the vehicle, such as motors, inverters, and battery stacks should be cooled, but since the cooling water passing through the engine and the cooling water passing through the electric parts have a given temperature difference therebetween, the vehicle cannot have a single cooling system.

FIGS. 1A and 1B are block diagrams showing conventional cooling systems for a vehicle, wherein FIG. 1A shows the cooling system for an engine, and FIG. 1B shows the cooling system for electric parts.

In more detail, an engine cooling system 10 includes a water pump 15 adapted to circulate cooling water for cooling an engine 1, a first radiator 11 for cooling the cooling water, a first cooling water storage tank 13 for supplying the cooling water to the first radiator 11, and a first cooling water adjusting cap 12.

According to the engine cooling system 10, at this time, the first radiator 11, the water pump 15 and the engine 1 are connected to each other through a first connection line 14.

Further, an electric part cooling system 20 includes a water pump 25 adapted to circulate cooling water for cooling electric parts 2, a second radiator 21 for cooling the cooling water, a second cooling water storage tank 23 for supplying the cooling water to the second radiator 21, and a second cooling water adjusting cap 22.

At this time, the electric parts 2 of the electric part cooling system 20 include an inverter and a generator used also as a starter.

According to the electric part cooling system 20, in the same manner as the engine cooling system 10, the second radiator 21, the water pump 25 and the electric parts 2 are connected to each other through a second connection line 24.

At this time, the first radiator 11 and the second radiator 21 constitute a cooling module, together with a condenser and a fan and shroud assembly, and the cooling water is heat-exchanged with vehicle wind and the air introduced through the fan and shroud assembly.

FIG. 2 shows one example of conventional cooling modules.

According to a cooling module 50 as shown in FIG. 2, however, the size of a condenser 30 is reduced by the area of the second radiator 21 formed, thus making it difficult to expect a sufficient condensing efficiency and to ensure a sufficient amount of cooling water flowing in the second radiator 21.

On the other hand, FIG. 3 shows another example of the conventional cooling modules.

According to a cooling module 50 as shown in FIG. 3, the condenser 30, the second radiator 21 and the first radiator 11 are arranged in parallel to each other in an air flow direction. However, the heated air passing through the condenser 30 passes through the second radiator 21, thus giving a bad influence on the performance of the second radiator 21.

According to the load of the condenser 30, further, the air supplied to the second radiator 21 has a drastic temperature difference, thus making it hard to ensure the stable performance of the second radiator 21.

Therefore, there is a definite need to develop a new cooling module capable of ensuring good performance of a first radiator, a second radiator and a condenser, while achieving the miniaturization in size.

SUMMARY OF THE INVENTION

Accordingly, the present invention has been made in view of the above-mentioned problems occurring in the prior art, and it is an object of the present invention to provide a cooling module and a cooling system for a vehicle that includes a first radiator, a second radiator, a first condenser, and a second condenser located inside the second radiator, thus enhancing refrigerant-condensing performance to provide the improvement in cooling efficiency and the reduction in the load of a compressor, and that allows a high temperature and high pressure refrigerant to pass through the water-cooled second condenser and then to pass through the air-cooled first condenser, thus enhancing the cooling efficiency of the refrigerant to improve the entire efficiency of the cooling system for the vehicle and rapidly reducing the specific volume of the superheated refrigerant to lower the discharging pressure of the compressor, so that the load of the compressor is reduced to enhance the durability of the compressor and reduce the energy consumed for cooling.

To accomplish the above-mentioned object, according to a first aspect of the present invention, there is provided a cooling module including: a first radiator for cooling an engine; a second radiator located in front of the first radiator in an air flow direction to cool electric parts; a first condenser located in front of the second radiator in the air flow direction to condense a refrigerant through heat exchange with external air; and a second condenser located inside the second radiator to condense the refrigerant through heat exchange with electric part cooling water, whereby the high temperature and high pressure refrigerant passes through the water-cooled second condenser and then passes through the air-cooled first condenser, thus enhancing the cooling efficiency of the refrigerant to improve the entire efficiency of a cooling system for the vehicle.

According to the present invention, preferably, the refrigerant introduced into the second condenser is heat-exchanged with the electric part cooling water, introduced into the first condenser through a connection pipe, heat-exchanged with the external air, and discharged to the outside, so that the high temperature and high pressure refrigerant is primarily cooled through the electric part cooling water and secondarily cooled through the external air, thus allowing the temperature of the air passing through the first condenser to be more lowered to ensure good cooling performance of the first radiator and the second radiator.

According to the present invention, preferably, the first radiator includes: a pair of first header tanks spaced apart from each other by a given distance in parallel to each other in a width direction of a vehicle, each first header tank having a first header and a first tank coupled to each other; first tubes whose both ends fixed to the pair of first header tanks to form an engine cooling water passage; and first fins disposed between the first tubes.

According to the present invention, preferably, the second radiator includes: a pair of second header tanks spaced apart from each other by a given distance in parallel to each other in the width direction of the vehicle, each second header tank having a second header and a second tank coupled to each other; an inlet and an outlet formed on the second header tanks to introduce and discharge the electric part cooling water thereinto and therefrom; second tubes whose both ends fixed to the second header tanks to form an electric part cooling water passage; and second fins disposed between the second tubes.

According to the present invention, preferably, the second condenser is extendedly located inside one of the pair of second header tanks in a length direction of the second header tank, and the refrigerant flow direction in the interior of the second condenser is different from the electric part cooling water flow direction in the second header tank in which the second condenser is located in the width direction of the vehicle.

According to the present invention, preferably, the inlet of the second radiator is formed on the upper side of the second header tank in which the second condenser is not located in a height direction of the vehicle, and at the lower side of the second header tank in the height direction of the vehicle is located a first pipe for introducing the refrigerant to the second condenser, thus making the configuration of the pipes simplified, so that the refrigerant in the second condenser is moved from the lower side of the second condenser to the upper side thereof and the electric part cooling water in the second header tank in which the second condenser is located is moved from the upper side of the second header tank to the lower side thereof, while having the opposite flow directions to each other, thus enhancing the heat exchange efficiency.

According to the present invention, preferably, the second condenser includes a pair of inlet and outlet bosses spaced apart from each other by a given distance to introduce and discharge the refrigerant thereinto and therefrom and a heat exchange portion whose both ends fixed to the pair of inlet and outlet bosses, the heat exchange portion of the second condenser having a shape of a double pipe or a plate.

According to the present invention, preferably, the first condenser includes: a pair of third header tanks spaced apart from each other by a given distance in parallel to each other, each third header tank having a third header and a third tank coupled to each other; third tubes whose both ends fixed to the pair of third header tanks to form a refrigerant passage; third fins disposed between the third tubes; a vapor-liquid separator disposed at one side third header tank; and a second pipe located on the other side third header tank to discharge the refrigerant.

According to the present invention, preferably, the connection pipe and the second pipe are located on the upper and lower sides of the third header tank located at the side on which the second condenser is located, and the vapor-liquid separator is connected to the third header tank at the side on which the second condenser is not located, whereby the first pipe for introducing the refrigerant, the connection pipe for connecting the first condenser and the second condenser, and the second pipe for discharging the refrigerant are located at one side of the cooling module in the width direction of the vehicle, thus making the configuration of the cooling module simplified.

According to the present invention, preferably, the first condenser includes: a condensing area on which the refrigerant introduced through the connection pipe is condensed, while flowing along a portion of the third tubes; a separating area on which the refrigerant is separated into vapor and liquid by means of the vapor-liquid separator; and a subcooling area on which the liquid refrigerant separated through the vapor-liquid separator is subcooled, while flowing along the rest of third tubes.

According to the present invention, preferably, the length of the second radiator is longer than the length of the first radiator and the length of the first condenser in the width direction of the vehicle, so that the cooling module has a three-column arrangement to enhance the respective heat exchangers (the first radiator, the second radiator and the first condenser), to ensure the condensing performance of the second condenser, and to minimize the length of the cooling module in the length direction of the vehicle.

According to the present invention, preferably, the pair of first headers and the pair of third headers are located between the pair of second headers in the width direction of the vehicle, so that the first headers of the first radiator and the third headers of the first condenser are located between the second headers of the second radiator with respect to the respective thickest headers of the first radiator, the second radiator and the first condenser in the length direction of the vehicle, thus minimizing the length of the cooling module in the length direction of the vehicle.

According to the present invention, preferably, the vapor-liquid separator is located between the pair of second headers in the width direction of the vehicle.

According to the present invention, preferably, the second radiator has a baffle adapted to partition the interior of the second header tank in which the second condenser is not located into upper and lower sides in the height direction of the vehicle, the inlet and the outlet being connected to the upper and lower sides of the second header tank partitioned by the baffle, so that the electric part cooling water introduced into the second header tank through the inlet is moved to the second header tank in which the second condenser is located through a portion of the second tubes, flows to the second header tank in which the second condenser is not located through the rest of second tubes, and is discharged through the outlet.

According to the present invention, preferably, the outlet of the second radiator is connected to the lower side of the second header tank in which the second condenser is located in the height direction of the vehicle, so that the electric part cooling water introduced into the second header tank through the inlet is moved to the second header tank in which the second condenser is located through the second tubes and discharged through the outlet.

To accomplish the above-mentioned object, according to a second aspect of the present invention, there is provided a cooling system for a vehicle having a cooling module according to the first aspect of the present invention, the cooling system including: a compressor for absorbing and compressing a refrigerant; the second condenser and the first condenser of the cooling module for sequentially condensing the refrigerant compressed in the compressor; an expansion valve for throttling the condensed refrigerant in the second condenser and the first condenser; and an evaporator for evaporating the refrigerant supplied through the expansion valve.

BRIEF DESCRIPTION OF THE DRAWINGS

The above and other objects, features and advantages of the present invention will be apparent from the following detailed description of the preferred embodiments of the invention in conjunction with the accompanying drawings, in which.

*Explanation of Reference Numerals*

Figure 1A:
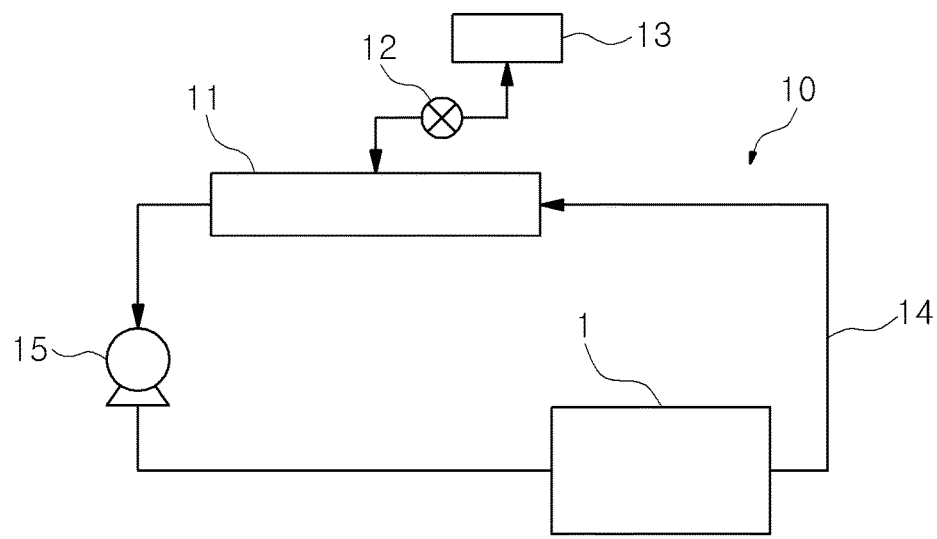
FIGS. 1A and 1B are block diagrams showing conventional cooling systems for a vehicle.
Figure 1B:
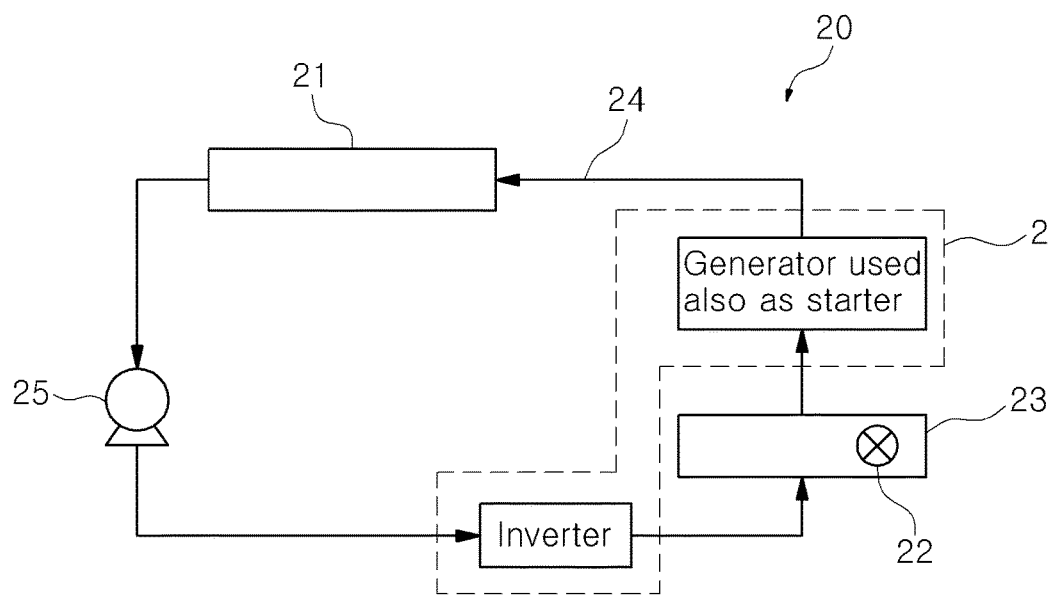
Figure 2:
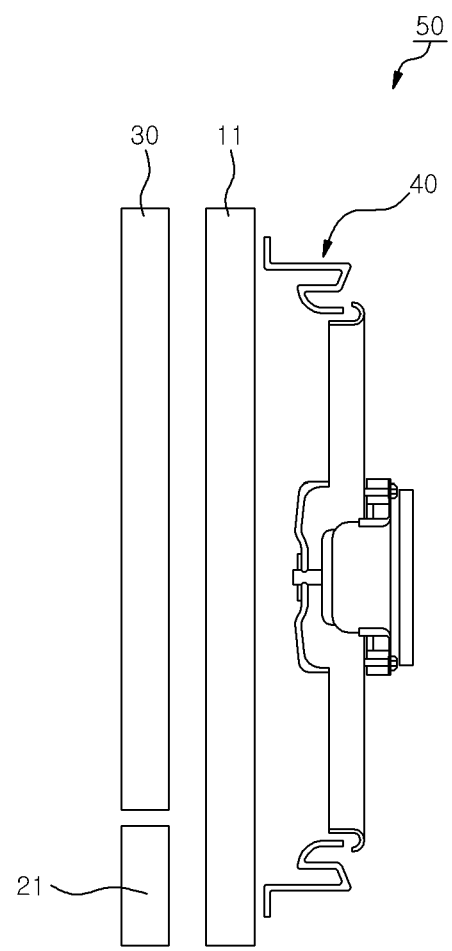
FIGS. 2 and 3 are schematic views showing conventional cooling modules.
Figure 3:
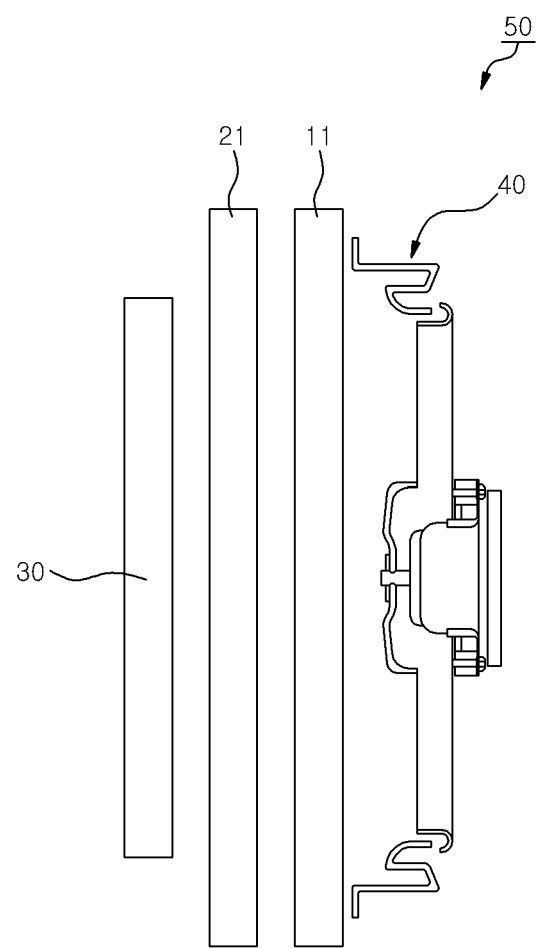
Figure 4:
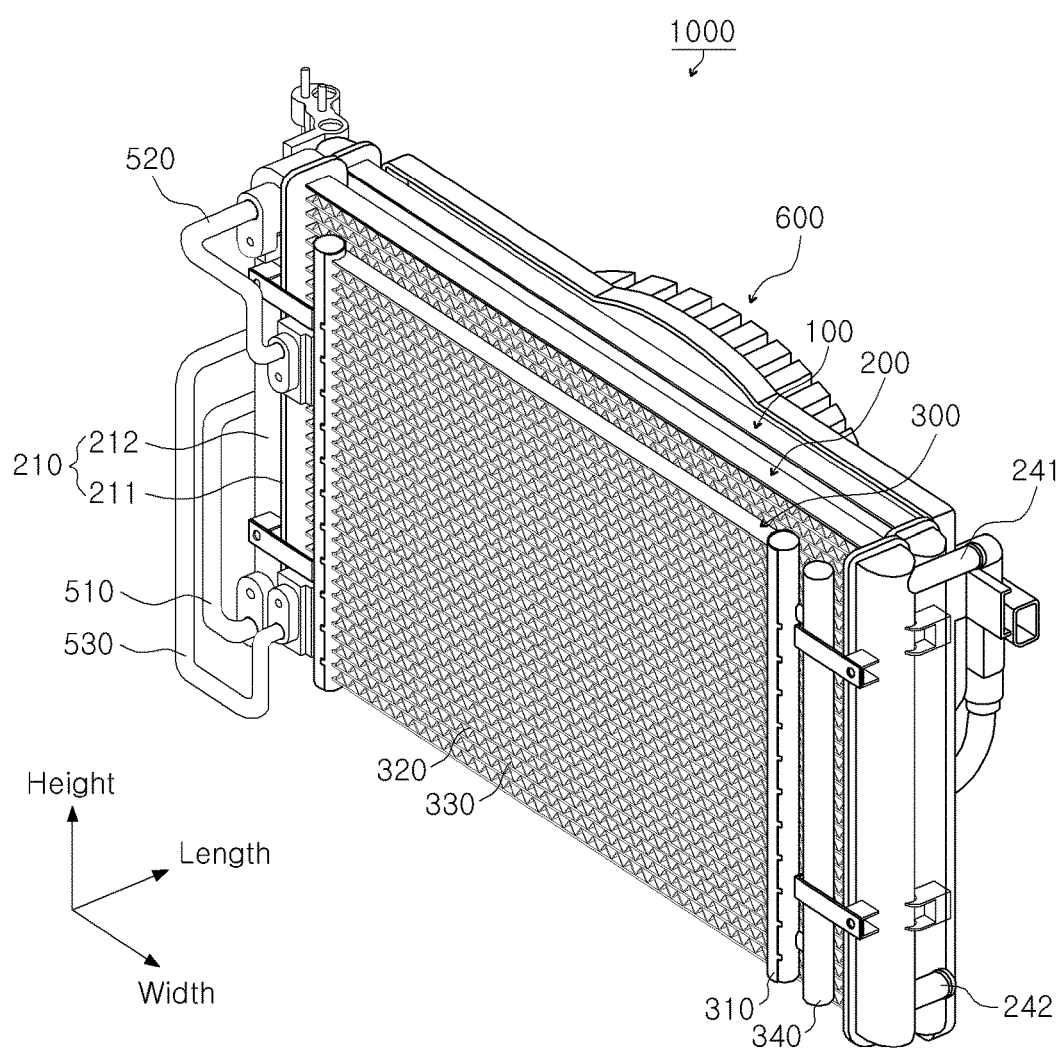
FIGS. 4 to 7 are perspective, exploded perspective, longitudinally sectional, and top plan views showing a cooling module according to the present invention.
Figure 5:
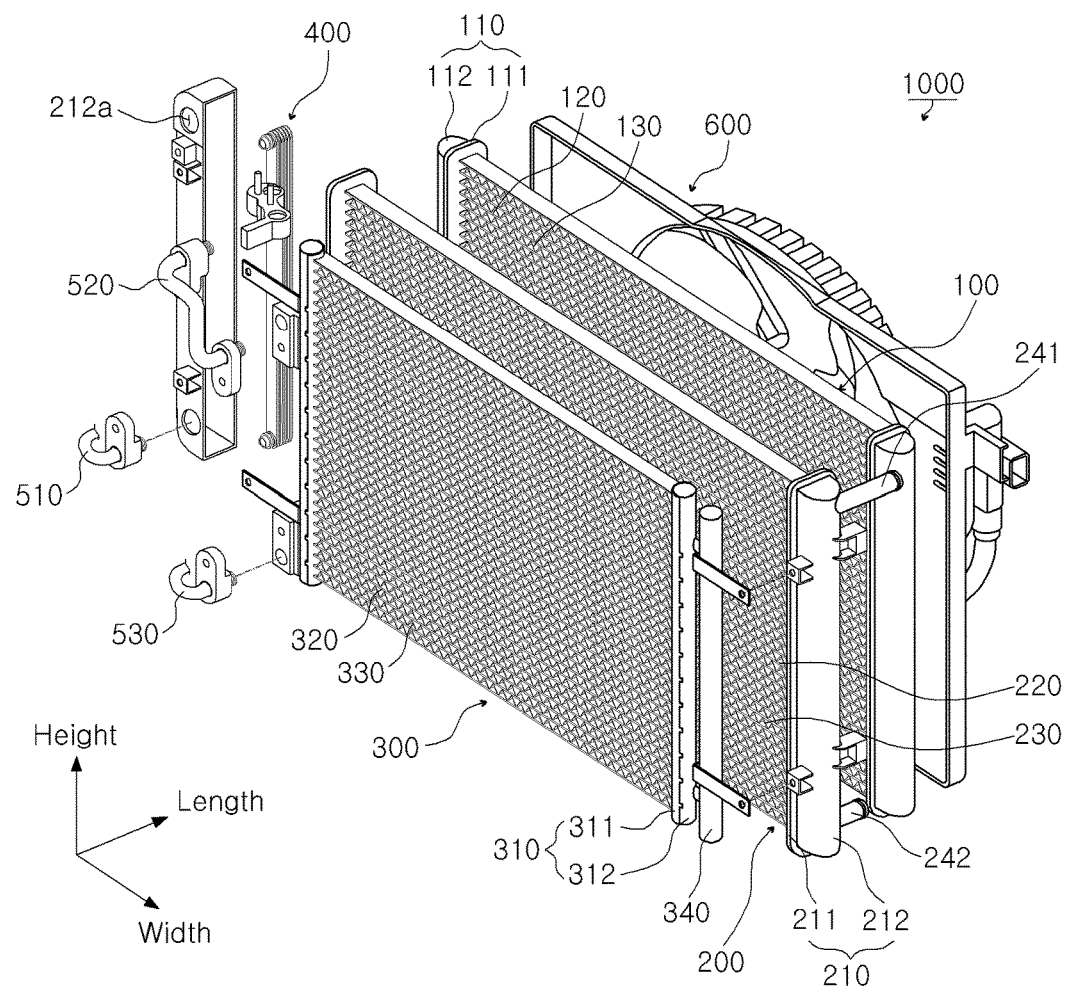
Figure 6:
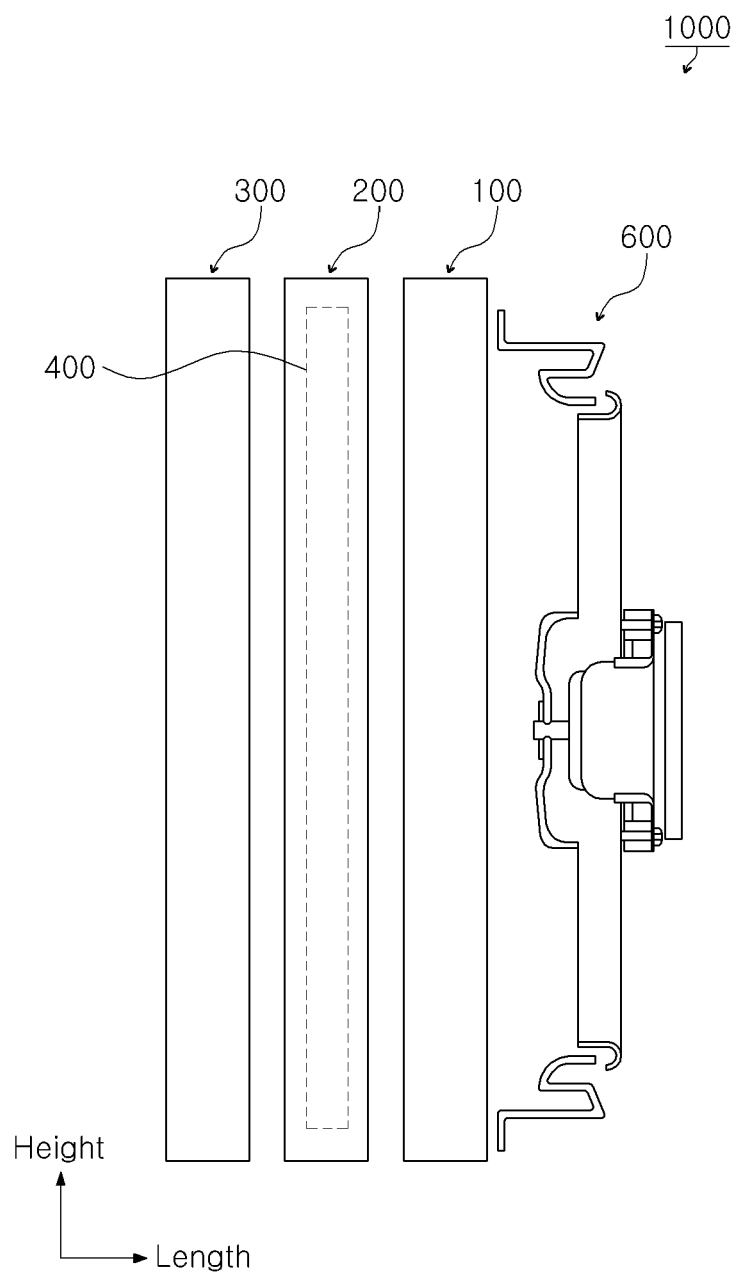

1000: cooling module
100: first radiator
110: first header tank      111: first header
112: first tank
120: first tube
130: first fin
200: second radiator
210: second header tank      211: second header
212: second tank      212a: hollow portion
213: baffle
220: second tube
230: second fin
241: inlet      242: outlet
300: first condenser
310: third header tank      311: third header
312: third tank
320: third tube
330: third fin
340: vapor-liquid separator
400: second condenser

*Explanation of Reference Numerals*

410: inlet and outlet boss
430: heat exchange portion
421: inner pipe      422: outer pipe
423: plate
510: first pipe
520: connection pipe
530: second pipe
600: fan and shroud assembly
A1: condensing area      A2: separating area
A3: subcooling area
L100: length in width direction of vehicle of first radiator
L200: length in width direction of vehicle of second radiator
L300: length in width direction of vehicle of first condenser
2000: cooling system for vehicle
2100: compressor
2200: expansion valve
2300: evaporator

DETAILED DESCRIPTION OF THE PREFERRED EMBODIMENTS

Hereinafter, an explanation on a cooling module and a cooling system for a vehicle according to the present invention will be in detail given with reference to the attached drawing.

Figure 7:
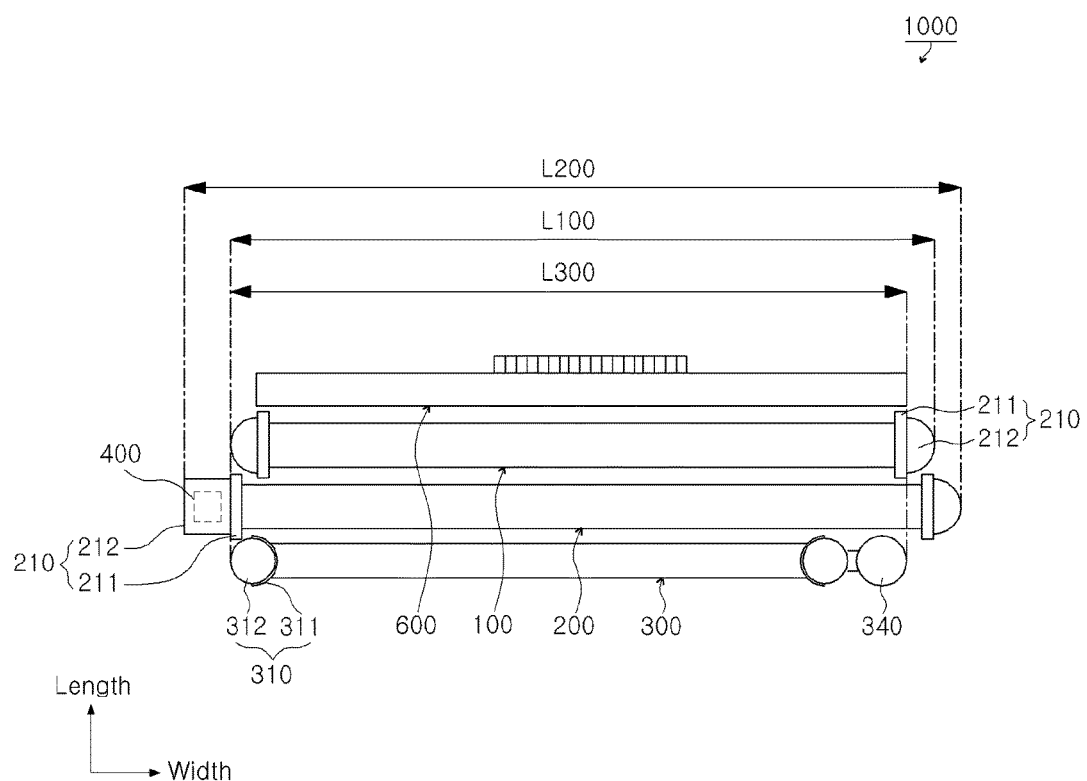
Figure 8:
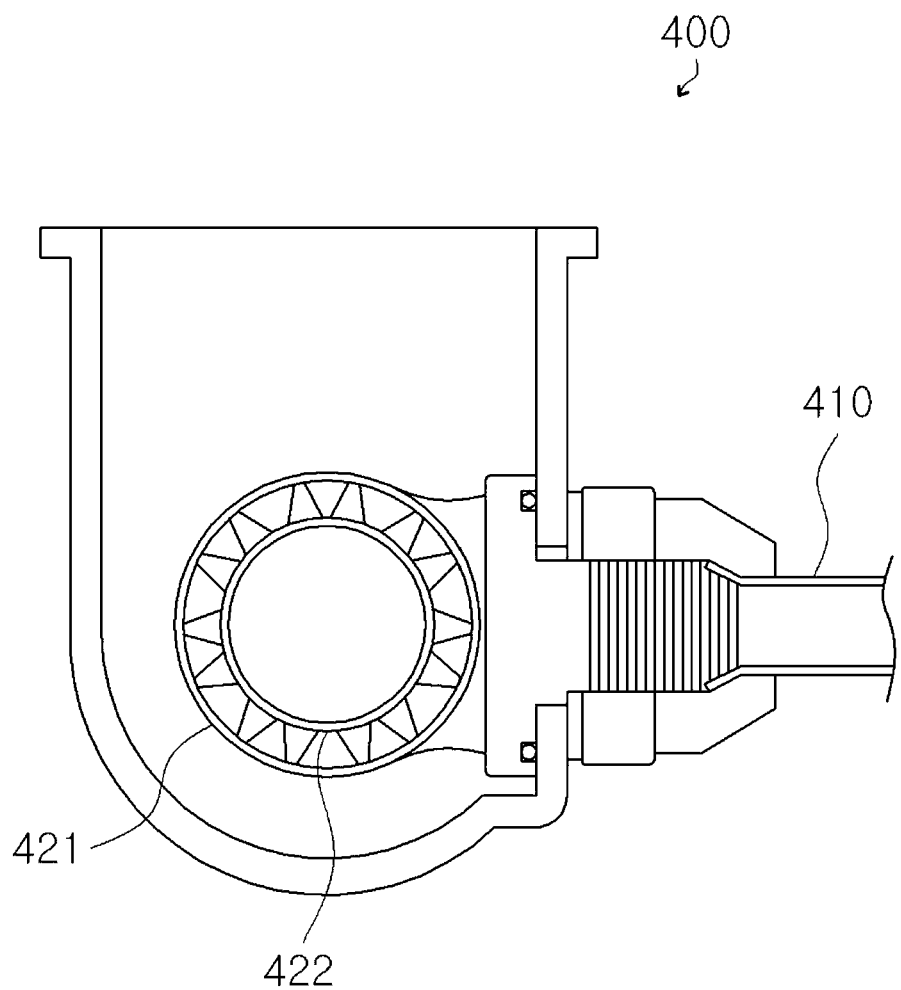
FIGS. 8 and 9 are fragmentary sectional and perspective views showing a second condenser of the cooling module according to the present invention.
Figure 9:
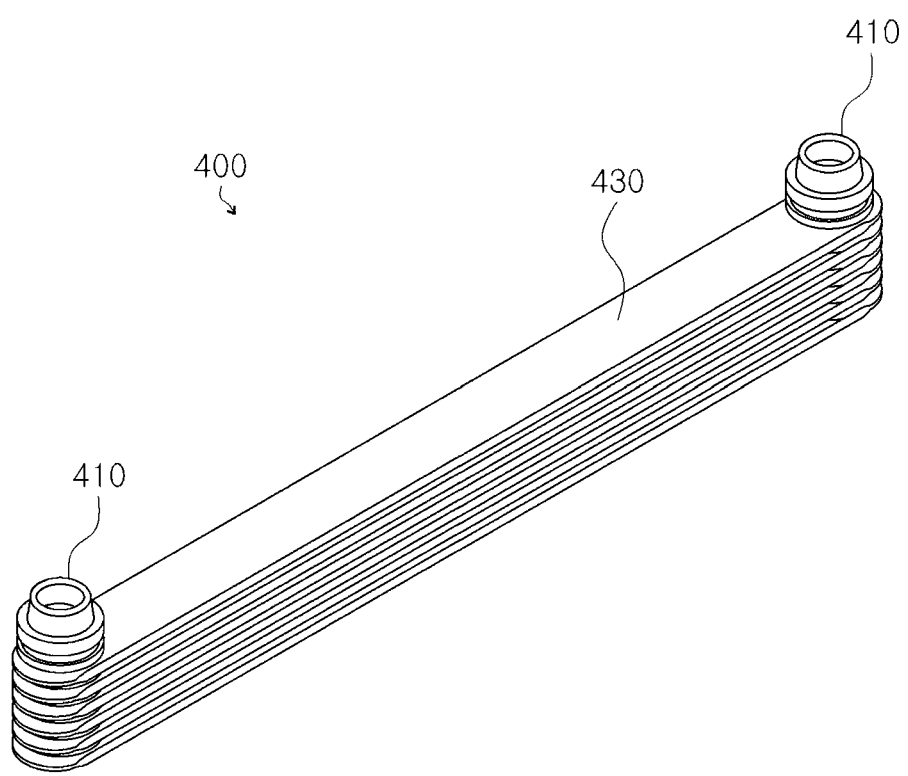
Figure 10:
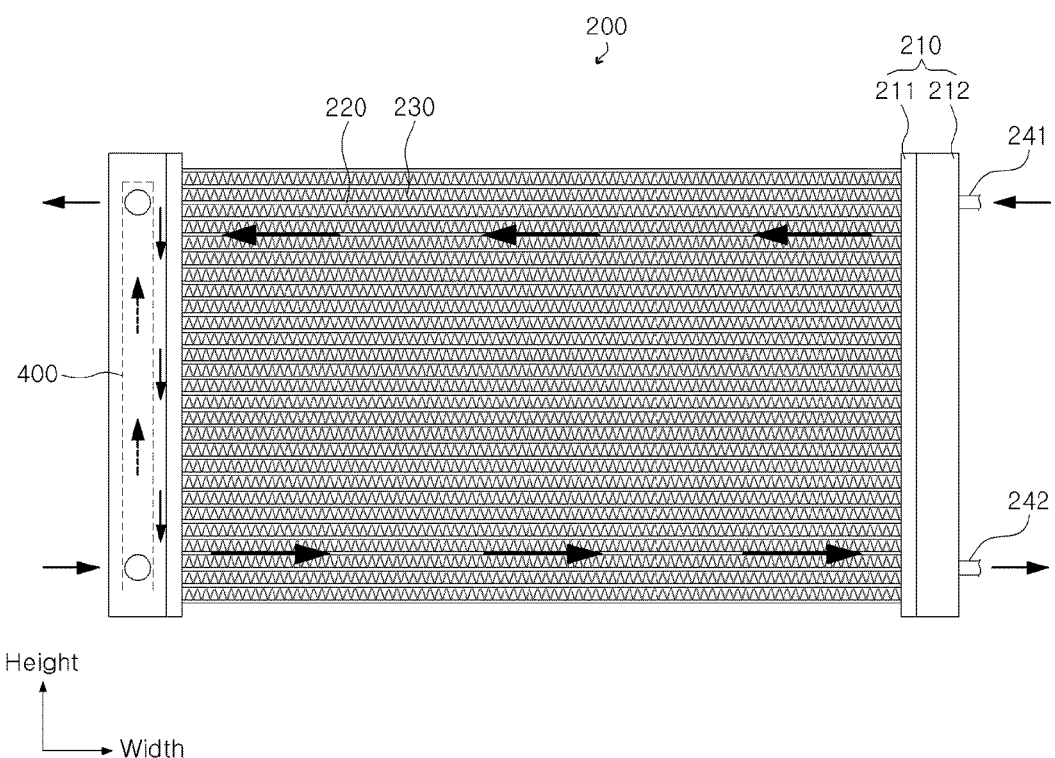
FIGS. 10 and 11 are front views showing the cooling water flow at the inside of a second radiator of the cooling module according to the present invention.
Figure 11:
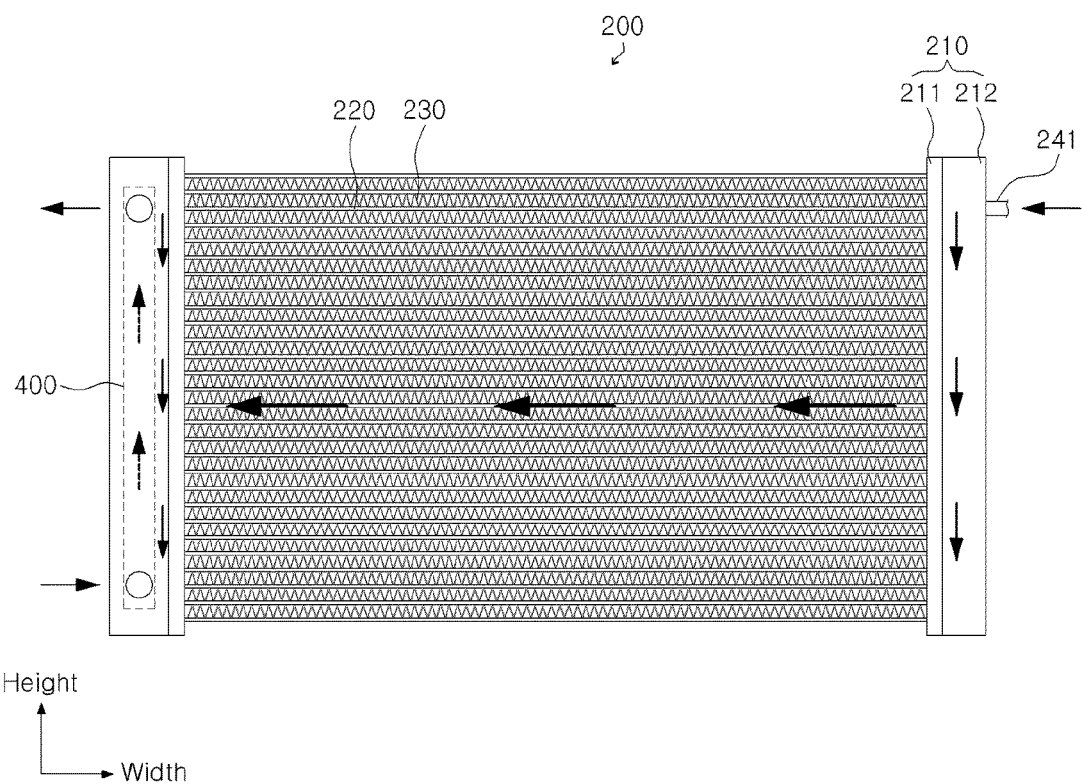
Figure 12:
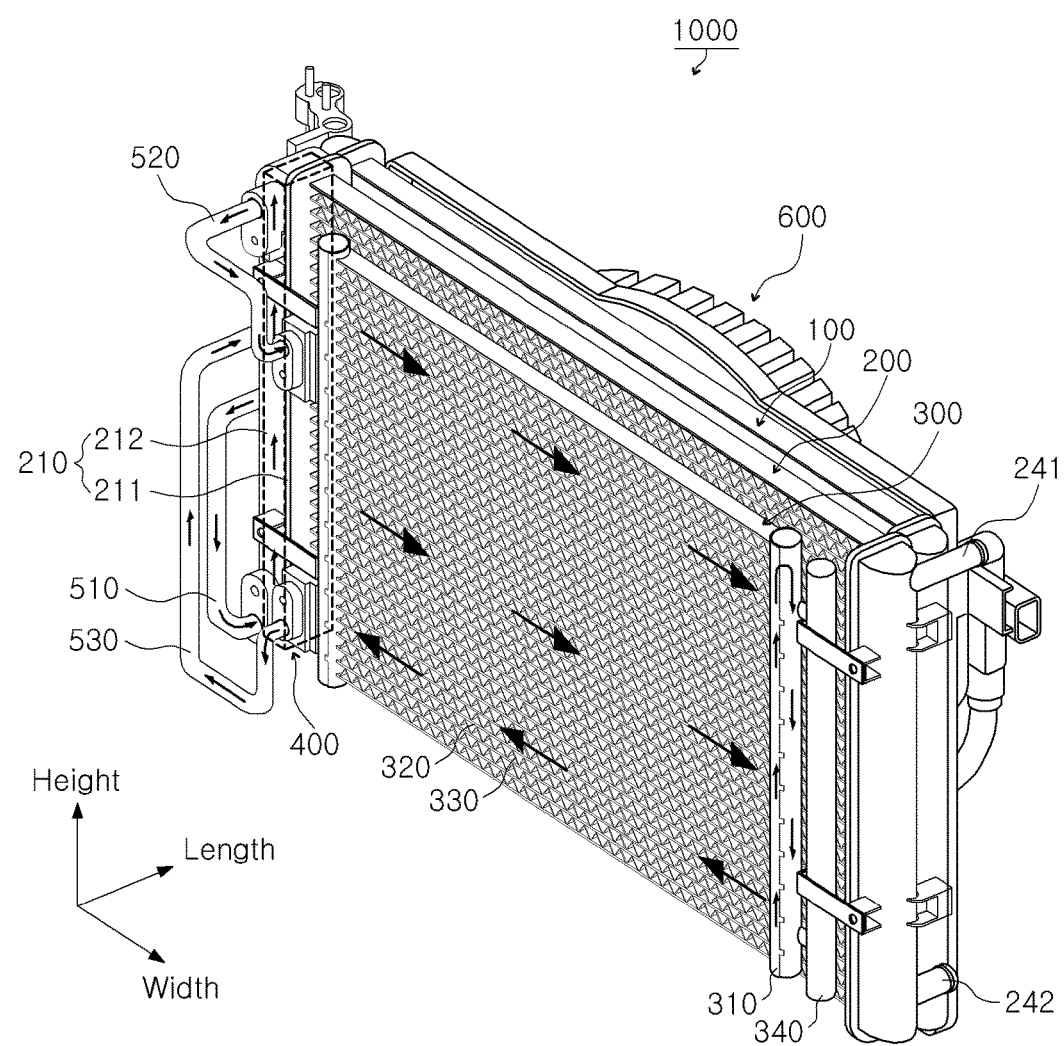
FIG. 12 is a perspective view showing the refrigerant flow in the cooling module according to the present invention.
Figure 13:
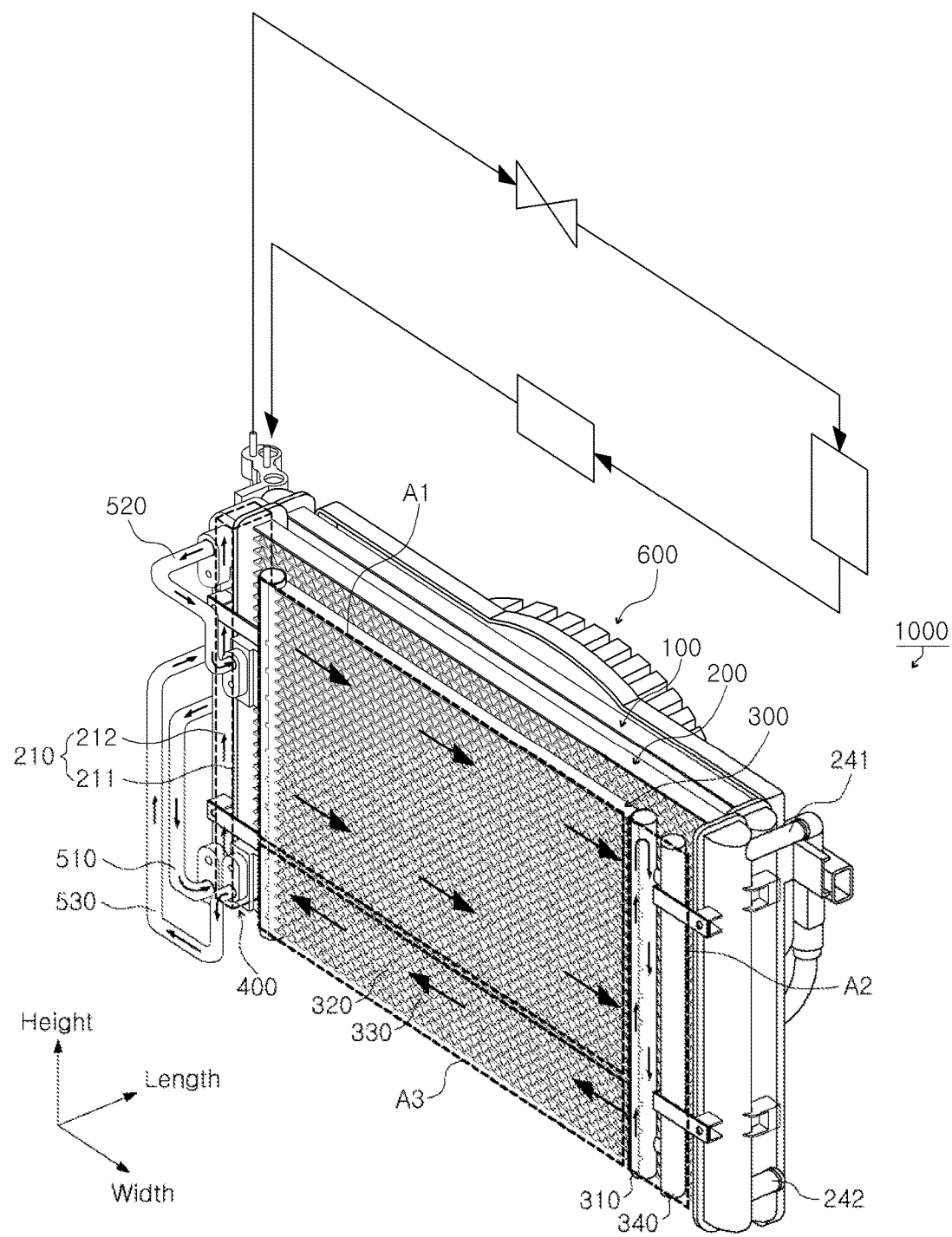
FIG. 13 is a perspective view showing a cooling system for a vehicle according to the present invention.

FIGS. 4 to 7 are perspective, exploded perspective, longitudinally sectional, and top plan views showing a cooling module according to the present invention, FIGS. 8 and 9 are fragmentary sectional and perspective views showing a second condenser of the cooling module according to the present invention, FIGS. 10 and 11 are front views showing the cooling water flow at the inside of a second radiator of the cooling module according to the present invention, FIG. 12 is a perspective view showing the refrigerant flow in the cooling module according to the present invention, and FIG. 13 is a perspective view showing a cooling system for a vehicle according to the present invention.

According to the present invention, a cooling module 1000 largely includes a first radiator 100, a second radiator 200, a first condenser 300, and a second condenser 400.

The first radiator 100 serves to cool an engine in such a manner as to allow engine cooling water flowing thereinto to be heat-exchanged with external air. In more detail, the first radiator 100 includes a pair of first header tanks 110 spaced apart from each other by a given distance in parallel to each other, first tubes 120 whose both ends fixed to the pair of first header tanks 110 to form an engine cooling water passage, and first fins 130 disposed between the first tubes 120. At this time, each first header tank 110 includes a first header 111 and a first tank 112 coupled to each other, and the pair of first header tanks 110 are spaced apart from each other by the given distance in a width direction of a vehicle.

The second radiator 200 serves to cool electric parts and is located in front of the first radiator 100 in an air flow direction in such a manner as to allow electric part cooling water flowing thereinto to be heat-exchanged with external air. The electric parts include electrical and electronic parts, such as motors, inverters, and battery stacks, and in addition thereto, they may include the parts that have lower heating temperatures than the engine and should be cooled. That is, the second radiator 200 is located in an electric vehicle (EV) or a hybrid electric vehicle (HEV). In more detail, the second radiator 200 includes a pair of second header tanks 210 spaced apart from each other by a given distance in parallel to each other, an inlet 241 and an outlet 242 formed on one side second header tank 210 to introduce and discharge the electric part cooling water thereinto and therefrom, second tubes 220 whose both ends fixed to the pair of second header tanks 210 to form an electric part cooling water passage, and second fins 230 disposed between the second tubes 220. At this time, each second header tank 210 includes a second header 211 and a second tank 212 coupled to each other, and the pair of second header tanks 210 are spaced apart from each other by the given distance in the width direction of the vehicle. The second header 211 has tube insertion holes (not shown) hollowed to sizes corresponding to the second tubes 220 so as to insert the second tubes 220 thereinto, and then, the second header 211 is coupled to the second tank 212 to form a space in which the electric part cooling water flows. At this time, the second condenser 400 is located inside one of the second header tanks 210, and thus, the second tank 212 of the second header tank 210 in which the second condenser 400 is located has hollow portions 212a adapted to fix the second condenser 400 thereto and to supply and discharge a refrigerant to and from the second condenser 400.

The first condenser 300 is located in front of the second radiator 200 in the air flow direction in such a manner as to allow the refrigerant to be condensed through the heat exchange with external air. In more detail, the first condenser 300 includes a pair of third header tanks 310 spaced apart from each other by a given distance in parallel to each other, third tubes 320 whose both ends fixed to the pair of third header tanks 310 to form a refrigerant passage, third fins 330 disposed between the third tubes 320, and a vapor-liquid separator 340 disposed at one side third header tank 310. At this time, each third header tank 310 includes a third header 311 and a third tank 312 coupled to each other, and the pair of third header tanks 310 are spaced apart from each other by the given distance in the width direction of the vehicle.

The second condenser 400 is located inside the second radiator 200 and condenses the refrigerant through the heat exchange with the electric part cooling water. In more detail, the second condenser 400 includes a pair of inlet and outlet bosses 410 spaced apart from each other by a given distance to introduce and discharge the refrigerant thereinto and therefrom and a heat exchange portion 430 whose both ends fixed to the pair of inlet and outlet bosses 410 to move the refrigerant thereinto. The heat exchange portion 430 has a shape of a double pipe or a plate, and FIG. 8 shows the double pipe type heat exchange portion 430 including an inner pipe 421 and an outer pipe 422, so that the refrigerant flows in the space between the inner pipe 421 and the outer pipe 422. At this time, the second condenser 400 is located inside one side second header tank 210 of the second radiator 200, and since the second header tank 210 is extendedly formed in the height direction of the vehicle, the second condenser 400 is also extended in the length direction of the second header tank 210 (in the height direction of the vehicle), thus ensuring a sufficient area wherein the refrigerant and the electric part cooling water are heat-exchanged with each other.

That is, the second condenser 400 is a water-cooled heat exchanger that conducts the heat exchange with the electric part cooling water, and the first condenser 300 is an air-cooled heat exchanger that conducts the heat exchange with the external air. According to the cooling module 1000, therefore, the refrigerant introduced into the second condenser 400 passes through a first area in which the refrigerant is heat-exchanged with the electric part cooling water, and the refrigerant passing through the first area passes through a second area in which the refrigerant is introduced into the first condenser 300 and heat-exchanged with the external air and then discharged. According to the cooling module 1000, the refrigerant is primarily cooled by means of the second condenser 400 and secondarily cooled by means of the first condenser 300, so that the specific volume of superheated refrigerant is rapidly reduced to enhance the cooling efficiency. Further, the temperature of the air passing through the first condenser 300 becomes lower than that in the conventional practice wherein only the air-cooled condenser is provided, thus obtaining excellent cooling performance of the second radiator 200.

So as to ensure sufficient heat exchange area and improve the cooling performance of the refrigerant, the cooling module 1000 according to the present invention is configured wherein the length L200 of the second radiator 200 is desirably longer than the length L100 of the first radiator 100 and the length L300 of the first condenser 300 (See FIG. 7). That is, the second radiator 200 in which the second condenser 400 is located has the largest size in the width direction of the vehicle, thus enhancing the refrigerant-condensing performance of the second condenser 400.

So as to minimize the length in the length direction of the vehicle, at this time, the pair of first headers 111 and the pair of third headers 311 are desirably located between the pair of second headers 211. According to the cooling module 1000, as mentioned above, the pair of first header tanks 110, the pair of second header tanks 210, and the pair of third header tanks 310 are spaced apart from each other by the given distance in the width direction of the vehicle, so that the lengths of the respective components in the length direction of the vehicle are dependent upon the first headers 111, the second headers 211 and the third headers 311. According to the present invention, therefore, the pair of first headers 111 and the pair of third headers 311 are desirably located between the pair of second headers 211, so that the first radiator 100, the second radiator 200 and the first condenser 300 are arranged close to each other in the length direction of the vehicle, thus advantageously minimizing the width of the cooling module 1000 in the length direction of the vehicle.

Furthermore, the cooling module 1000 according to the present invention has the vapor-liquid separator 340 located between the pair of second headers 211.

On the other hand, the cooling module 1000 according to the present invention has a three-column arrangement in which the first condenser 300, the second radiator 200 and the first radiator 100 are located in the air flow direction. If the electric part radiator and the condenser are located on the same column as each other, an area in which a core portion (tubes and fins) is formed is formed in two columns, thus reducing the length of the cooling module in the length direction of the vehicle. So as to provide the water-cooled condenser inside the electric part radiator, however, the size of the header tank of the electric part radiator becomes bulky in the length direction of the vehicle, thus having a limitation in the reduction of the entire length of the cooling module. According to the present invention, therefore, the cooling module 1000 has the three-column arrangement to increase the heat exchange areas of the respective heat exchangers (the first condenser 300, the second radiator 200 and the first radiator 100), and particularly, the cooling module 1000 ensures the space in which the second condenser 400 is located inside the second radiator 200, thus enhancing the refrigerant-cooling performance. Further, the first condenser 300, the second radiator 200 and the first radiator 100 are arranged close to each other in the length direction of the vehicle, thus minimizing the size of the cooling module 1000 in the length direction of the vehicle.

According to present invention, the second condenser 400 is located inside one of the pair of second header tanks 210, and the inlet 241 is formed on the upper side of the second header tank 210 in which the second condenser 400 is not located in the height direction of the vehicle so as to introduce the electric part cooling water into the second radiator 200. Further, a first pipe 510 is located at the lower side of the second header tank 210 in the height direction of the vehicle so as to introduce the refrigerant into the second condenser 400. That is, the second condenser 400 is located inside one side second header tank 210 of the second radiator 200, so that the refrigerant is supplied to the lower side of the second condenser 400 and moved to the upper side thereof. The inlet 241 is formed on the upper side of the other side second header tank 210 (in which the second condenser 400 is not located), so that the electric part cooling water is moved from the upper side of one side second header tank 210 to the lower side thereof. In more detail, the electric part cooling water is moved from the upper side of one side second header tank 210 in which the second condenser 400 is located to the lower side thereof, and the refrigerant in the second condenser 400 is moved from the lower side of the second condenser 400 to the upper side thereof, thus enhancing the refrigerant-cooling efficiency (in the height direction of the vehicle, the refrigerant flow in the second condenser 400 and the electric part cooling water flow of the second heater tank 210 in which the second condenser 400 is located are opposite to each other). FIGS. 10 and 11 show the electric part cooling water flow and the refrigerant flow in the second radiator 200, wherein the electric part cooling water flow is indicated by solid lines, and the refrigerant flow by dotted lines. As shown in FIGS. 10 and 11, the second header tank 400 is located in the left side second header tank 210, and the inlet 241 is formed on the upper side of the right side second header tank 210. FIG. 10 shows the outlet 242 formed on the lower side of the second header tank 210 in which the second condenser 400 is not located, thus providing U type flow. Further, FIG. 11 shows the outlet 242 formed on the lower side of the second header tank 210 in which the second condenser 400 is located, thus providing cross type flow.

Referring to FIG. 10, first, the U type electric part cooling water flow will be explained. In this case, a baffle (not shown) is disposed inside the other side second header tank 210, and accordingly, the electric part cooling water introduced into the other side second header tank 210 through the inlet 241 is moved to one side second header tank 210 through a portion of the second tubes 220, flows to the lower side of one side second header tank 210 from the upper side thereof, moved to the other side second header tank 210 through the rest of second tubes 220, and then discharged through the outlet 242. The second radiator 200 having the U type flow has the inlet 241 and the outlet 242 formed on the upper and lower sides of the other side second header tank 210, thus making it easy to be connected to pipes and advantageously utilizing the entire interior of one side second header tank 210 as the space in which the second condenser 400 is located.

Referring to FIG. 11, next, the cross type electric part cooling water flow will be explained. In this case, the electric part cooling water introduced into the other side second header tank 210 through the inlet 241 is moved to one side second header tank 210 through the second tubes 220, flows to the lower side of one side second header tank 210 from the upper side thereof, and then discharged through the outlet 242.

In addition to the flow types as shown in FIGS. 10 and 11, further, the cooling module 1000 according to the present invention may have various electric part cooling water flow types.

At this time, the cooling module 1000 according to the present invention includes a fan and shroud assembly 600, and as shown in FIGS. 4 to 7, the fan and shroud assembly 600 is disposed behind the first radiator 100 in the air flow direction.

According to the cooling module 1000, the refrigerant is supplied to the lower side of the second condenser 400 by means of the first pipe 510, and after passing through the second condenser 400, it is introduced into the first condenser 300 by means of a connection pipe 520 connecting the second condenser 400 and the first condenser 300 with each other. Next, the refrigerant passing through the first condenser 300 is discharged through a second pipe 530 formed on the first condenser 300. At this time, the connection pipe 520 has one side end portion connected to the upper side of the second condenser 400 and the other side end portion connected to the upper side of the third header tank 310 located at the side on which the second condenser 400 is located in the width direction of the vehicle. Desirably, the second pipe 530 is connected to the lower side of the third header tank 310 located at the side on which the second condenser 400 is located in the width direction of the vehicle, and the vapor-liquid separator 340 is connected to the third header tank 310 located at the side on which the second condenser 400 is not located. According to the cooling module 1000, therefore, the respective pipes for introducing, connecting and discharging the refrigerant are located at the side on which the second condenser 400 is located in the width direction of the vehicle, thus making the configuration of the pipes simplified, and further, the vapor-liquid separator 340 is located at the opposite side to the side on which the pipes are located, thus making it easy to be designed in configuration.

Now, the refrigerant flow in the cooling module 1000 according to the present invention will be explained with reference to FIGS. 12 and 13. First, the refrigerant introduced into the second condenser 400 through the first pipe 510 is moved from the lower side of the second condenser 400 to the upper side thereof, primarily heat-exchanged with the electric part cooling water of the second radiator 200, and introduced into the first condenser 300 through the connection pipe 520. Next, the refrigerant introduced through the connection pipe 520 passes through a condensing area A1 on which the refrigerant is condensed, while flowing along a portion of the third tubes 320, moved to the vapor-liquid separator 340, and passes through a separating area A2 on which the refrigerant is separated into vapor and liquid by means of the vapor-liquid separator 340. After that, the separated liquid refrigerant flows along the third tubes 320, passes through a subcooling area A3 on which the refrigerant is subcooled, while flowing along the rest of third tubes 320, and is discharged through the second pipe 530. At this time, the first condenser 300 further includes a baffle (not shown) disposed inside the third header tank 310 to partition the condensing area A1 and the subcooling area A3. In addition to the refrigerant flow as shown in FIGS. 12 and 13, the cooling module 1000 according to the present invention may have various refrigerant flows through the changes of the positions of the first pipe 510, the connection pipe 520 and the second pipe 530, the number of baffles, and the positions of baffles.

On the other hand, a cooling system 2000 for a vehicle according to the present invention includes a compressor 2100, the second condenser 400, the first condenser 300, an expansion valve 2200, and an evaporator 2300.

The compressor 2100 is activated with the power received from a power supply source (engine or motor), absorbs and compresses the vapor refrigerant discharged from the evaporator 2300, and discharges the refrigerant compressed to high temperature and high pressure gas to the second condenser 400.

The refrigerant introduced into the second condenser 400 is primarily cooled in a water-cooled manner, moved to the first condenser 300, and secondarily cooled in an air-cooled manner. Accordingly, the high temperature and high pressure vapor refrigerant discharged from the compressor 2100 is condensed to a high temperature and high pressure liquid refrigerant.

The expansion valve 2200 serves to rapidly expand the high temperature and high pressure liquid refrigerant discharged from the first condenser 300 by means of throttling action and discharge the refrigerant wet and saturated to a low temperature and low pressure state to the evaporator 2300.

The evaporator 2300 conducts the heat exchange of the low pressure liquid refrigerant throttled in the expansion valve 2200 with the air blowing into the interior of the vehicle, evaporates the liquid refrigerant, and cools the air discharged to the interior of the vehicle by means of the heat-absorbing action generated by the vaporization latent heat of the refrigerant.

Through the formation of the second condenser 400 and the first condenser 300, accordingly, the cooling system 2000 for the vehicle according to the present invention can increase the cooling efficiency, rapidly reduce the specific volume of the superheated refrigerant, and lower the discharging pressure of the compressor 2100. More particularly, the cooling system 2000 for the vehicle according to the present invention can condense the refrigerant, thus rapidly reducing the specific volume of the superheated refrigerant and minimizing the pressure loss, and can reduce the pressure drop of the refrigerant, thus lowering the discharging pressure of the compressor 2100. Further, the cooling system 2000 for the vehicle according to the present invention can decrease the load of the compressor 2100, thus enhancing the durability and reducing the energy consumed for cooling.

As described above, the cooling module and the cooling system for the vehicle according to the present invention includes the first radiator, the second radiator, the first condenser, and the second condenser located inside the second radiator, thus enhancing the refrigerant-condensing performance to provide the improvement in the cooling efficiency and the reduction in the load of the compressor. Particularly, the high temperature and high pressure refrigerant passes through the water-cooled second condenser and then passes through the air-cooled first condenser, thus enhancing the cooling efficiency of the refrigerant to improve the entire efficiency of the cooling system for the vehicle and rapidly reducing the specific volume of the superheated refrigerant to lower the discharging pressure of the compressor. Accordingly, the cooling system for the vehicle according to the present invention can decrease the load of the compressor, thus enhancing the durability and reducing the energy consumed for cooling.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A cooling module comprising:
    a first radiator cooling an engine;
    a second radiator disposed in front of the first radiator in an air flow direction, the second radiator cooling electric parts;
    a first condenser located in front of the second radiator in the air flow direction to condense a refrigerant through heat exchange with external air; and
    a second condenser disposed inside the second radiator to condense the refrigerant through heat exchange with electric part cooling water,
    wherein the refrigerant condensed in the second condenser is heat-exchanged with the electric part cooling water, introduced into the first condenser through a connection pipe, heat-exchanged with the external air, and discharged from the first condenser,
    wherein the first radiator further comprises:
        a pair of first header tanks spaced apart in a width direction of a vehicle, each of the pair of first header tanks having a first header and a first tank;
        a plurality of first tubes having ends fixed by the pair of first header tanks to form an engine cooling water passage; and
        a plurality of first fins disposed between the plurality of first tubes,
    wherein the second radiator further comprises:
        a pair of second header tanks spaced apart in the width direction of the vehicle, each of the pair of second header tanks having a second header and a second tank;
        an inlet formed on the pair of second header tanks to introduce the electric part cooling water into the pair of second header tanks;
        an outlet formed on the pair of second header tanks to discharge the electric part cooling water from the pair of second header tanks;
        a plurality of second tubes having ends fixed by the pair of second header tanks to form an electric part cooling water passage; and
        a plurality of second fins disposed between the plurality of second tubes.

2. The cooling module according to claim 1, wherein the second condenser is disposed inside a first one of the pair of second header tanks extending in a length direction of the first one of the pair of second header tanks, and a refrigerant flow direction in an interior of the second condenser is different from an electric part cooling water flow direction in the first one of the pair of second header tanks.

3. The cooling module according to claim 2, wherein the inlet formed on the pair of second header tanks of the second radiator is formed on an upper side of a second one of the pair of second header tanks in a height direction of the vehicle.

4. The cooling module according to claim 3, wherein a first pipe for introducing the refrigerant to the second condenser is disposed in a lower side of the first one of the pair of second header tanks in the height direction of the vehicle.

5. The cooling module according to claim 4, wherein the first condenser further comprises:

a pair of third header tanks spaced apart from each other, each of the pair of third header tanks having a third header and a third tank;

a plurality of third tubes having ends fixed by the pair of third header tanks to form a refrigerant passage;

a plurality of third fins disposed between the plurality of third tubes;

a vapor-liquid separator disposed on a first one of the pair of third header tanks; and a second pipe disposed on a second one of the pair of third header tanks to discharge the refrigerant.

6. The cooling module according to claim 5, wherein the connection pipe is connected to an upper side of the second one of the pair of third header tanks and the second pipe is connected to a lower side of the second one of the pair of third header tanks, wherein the second one of the pair of third header tanks is located adjacent the first one of the pair of second header tanks, and wherein the first one of the pair of third header tanks is spaced from the first one of the pair of second header tanks.

7. The cooling module according to claim 6, wherein the first condenser further comprises:
    a condensing area where the refrigerant introduced through the connection pipe is condensed, the condensing area formed within a first portion of the plurality of third tubes;
    a separating area where the refrigerant is separated into a vapor portion and a liquid portion, the separating area formed within the vapor-liquid separator; and
    a subcooling area where the liquid portion of the refrigerant separated in the vapor-liquid separator is subcooled, the subcooling area formed within a second portion of the plurality of third tubes.

8. The cooling module according to claim 3, wherein the second radiator has a baffle partitioning an interior of the second one of the pair of second header tanks into the upper side and a lower side in the height direction of the vehicle, the outlet formed on the pair of second header tanks of the second radiator is connected to a lower side of the second one of the pair of second header tanks, wherein the electric part cooling water introduced into the second one of the pair of second header tanks through the inlet flows to the first one of the pair of second header tanks through a first portion of the plurality of second tubes, flows back to the second one of the pair of second header tanks through a second portion of the plurality of second tubes, and is discharged through the outlet.

9. The cooling module according to claim 3, wherein the outlet formed on the pair of second header tanks of the second radiator is connected to a lower side of the first one of the pair of second header tanks, wherein the electric part cooling water introduced into the second one of the pair of second header tanks through the inlet flows to the first one of the pair of second header tanks through the plurality of second tubes and is discharged through the outlet.

10. The cooling module according to claim 5, wherein a length of the second radiator in the width direction of the vehicle is greater than a length of the first radiator in the width direction of the vehicle and a length of the first condenser in the width direction of the vehicle.

11. The cooling module according to claim 10, wherein the pair of first header tanks and the pair of third header tanks are located between the pair of second header tanks in the width direction of the vehicle.

12. The cooling module according to claim 11, wherein the vapor-liquid separator is located between the pair of second header tanks in the width direction of the vehicle.

13. The cooling module according to claim 2, wherein the second condenser further comprises:
    an inlet boss and an outlet boss spaced apart from each other to introduce the refrigerant to the second condenser and discharge the refrigerant from the second condenser; and
    a heat exchange portion having ends respectively fixed to the inlet boss and the outlet boss.

14. The cooling module according to claim 13, wherein the heat exchange portion of the second condenser has a shape of a double pipe or a plate.

15. A cooling system for the vehicle having the cooling module according to claim 1, the cooling system further comprising:
    a compressor compressing the refrigerant, wherein the second condenser and the first condenser of the cooling module sequentially condense the refrigerant compressed by the compressor;
    an expansion valve throttling the refrigerant condensed by the second condenser and the first condenser; and
    an evaporator evaporating the refrigerant throttled by the expansion valve.

* * * * *